United States Patent [19]

Marsocci

[11] Patent Number: 4,488,049

[45] Date of Patent: Dec. 11, 1984

[54] MOVING WALL TEST DEVICE IN OPTICAL SMOKE DETECTORS

[75] Inventor: Angelo A. Marsocci, Duxbury, Mass.

[73] Assignee: American District Telegraph Company, Jersey City, N.J.

[21] Appl. No.: 319,444

[22] Filed: Nov. 9, 1981

[51] Int. Cl.[3] ........................ G08B 17/10; G01N 21/53

[52] U.S. Cl. .................................. 250/574; 340/630; 356/338

[58] Field of Search ................ 250/574, 575; 340/515, 340/630; 356/338, 438, 439

[56] References Cited

U.S. PATENT DOCUMENTS

| | | | |
|---|---|---|---|
| 4,144,458 | 3/1979 | Doherty | 250/574 |
| 4,216,377 | 8/1980 | Hasegawa et al. | 250/574 |
| 4,374,329 | 2/1983 | Schoenfelder et al. | 250/574 |

*Primary Examiner*—Edward P. Westin

*Attorney, Agent, or Firm*—James H. Grover

[57] ABSTRACT

An optical smoke detector has an optical block canopied by a substantially broad surfaced wall member that is pivotally attached to the opposite sides of the optical block and substantially spaced from the active surface of the optical block itself such that the sides of the wall member are open to stray ambient light. Manual owner-test-actuation of the alarm is accomplished by depressing an externally extending push-button which in turn gradually moves the wall member inwardly of the optical block. The gradual and consequent decrease in reaction volume between the light scattering surface of the moving wall member and the optical block, the optical block housing an infrared light emitting diode and an infrared photosensitive cell, creates a simulated atmosphere of smoke infiltration so as to cause an associated alarm circuit to be innervated.

6 Claims, 3 Drawing Figures

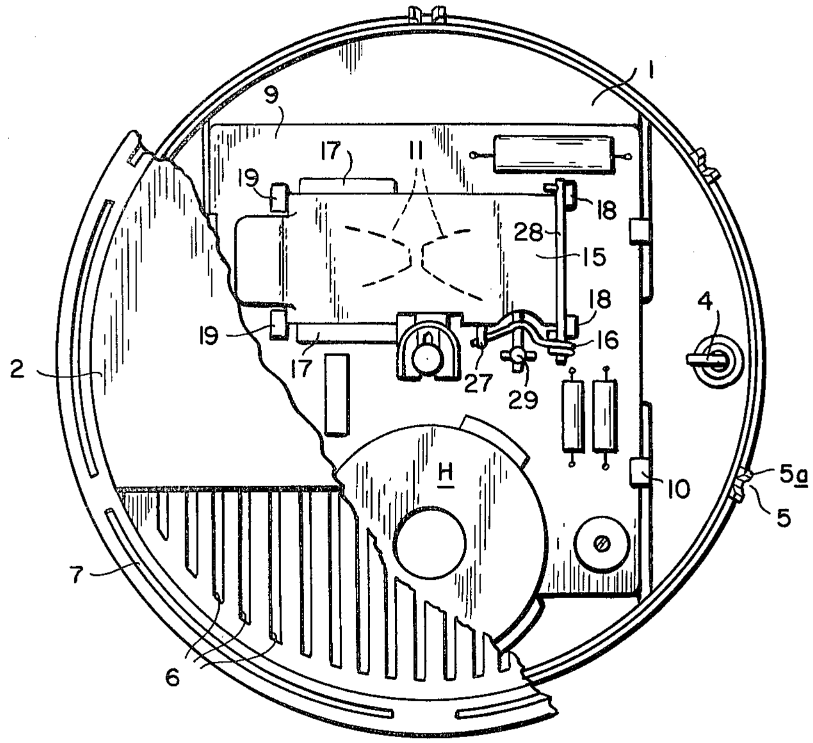
FIG. 1
FIG. 2
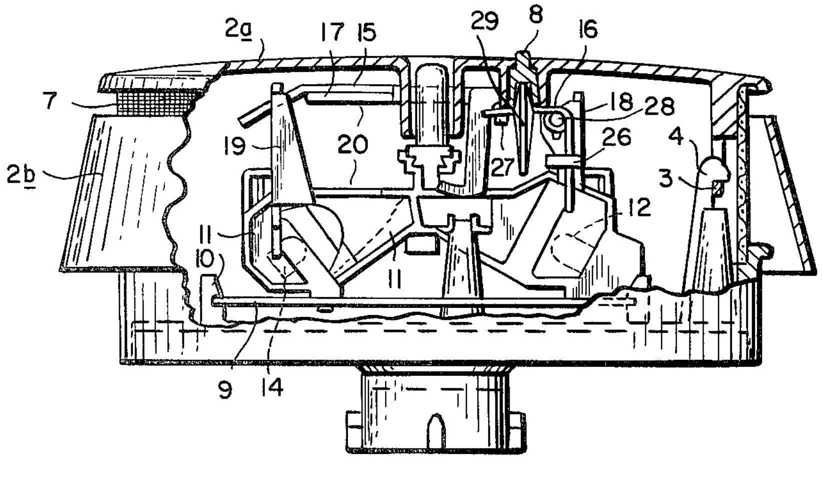

MOVING WALL TEST DEVICE IN OPTICAL SMOKE DETECTORS

BACKGROUND OF THE INVENTION

This invention relates to optical smoke detectors having simple and inexpensive test devices such as are described in greater detail in U.S. Pat. No. 3,868,184 and U.S. Pat. No. 4,166,698.

In both the above mentioned patents the optical smoke detectors comprise a beam of light directed from a light source along a path or axis usually located within a dark smoke chamber having ports to admit air but exclude ambient light. Light scattered from particles in the light path is viewed by a photocell which in turn responds by sending a signal to an associated alarm circuit. Accordingly, the introduction of a fine, fragile wire or a light scattering flag, from an unviewed position to a viewed or detection zone intruding position in the dark smoke chamber, is used to simulate smoke particles in the chamber.

Although the art of record is effective in extemporaneously testing the capacity of an optical smoke detector to alarm in response to a predetermined smoke density, such art requires the relatively strict maintenance of the integrity of a dark smoke chamber. In addition, the use of a fine, fragile wire or a light scattering flag sometimes still fails to provide a testing means that is completely independent of the position of the filament in the light source and of consequent variations in the location of the light path in the dark chamber.

It is therefore an object of the present invention to provide an optical smoke detector with testing means that need not include a fine, fragile wire or a light scattering flag and which is even more independent of filament position in different light sources and of the consequent variations in the direction of the light path in a dark chamber than the prior art.

It is a further object of the present invention to provide an optical smoke detector with testing means that are less dependent upon the absence of ambient light than the prior art.

SUMMARY OF THE INVENTION

According to the invention a smoke detector comprises a base, a source of light on the base directing light on a path, a photosensitive device on the base responsive to light scattered by particles in the light path, and a wall canopied over the source of light and photosensitive device and pivotally mounted on the base wherein the wall is in the light path and has a substantial area on one side of a substantial volume viewed by the photosensitive device, the wall being mounted to move toward the photosensitive device from a normal position in which an insignificant intensity of light is reflected by the area toward the device through intermediate positions closer to the device through which movement of the wall continuously increases the light scattered to the device.

Also according to the invention the source of light and the photosensitive device respectively emit and sense infrared light.

DRAWINGS

FIG. 1 is a plan view of a smoke detector according to the invention, partly broken away;

FIG. 2 is a cross sectional side view of FIG. 1; and

DESCRIPTION

Figure 3:
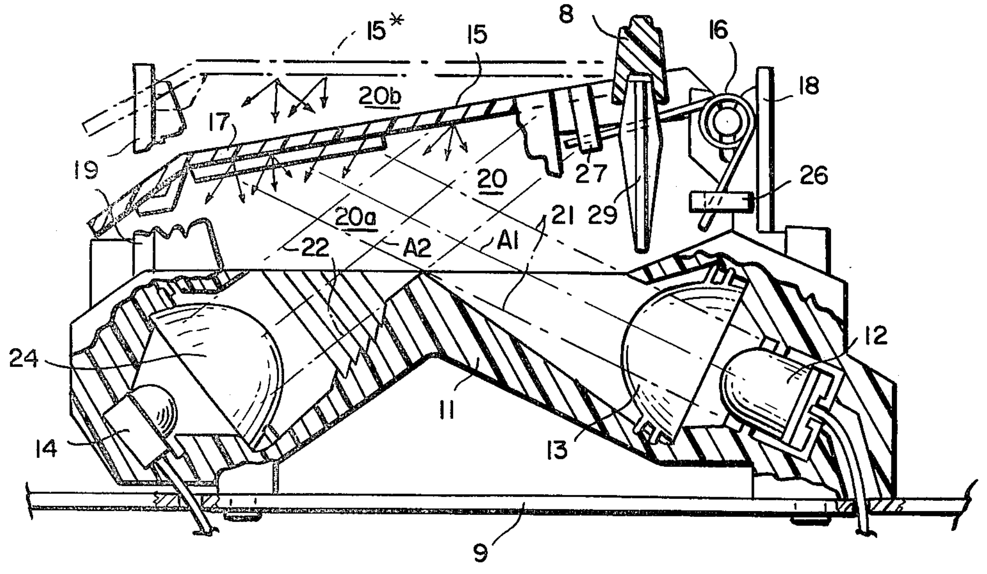
FIG. 3 is a cross sectional side elevation of a moving wall and optical block according to the invention.

In FIGS. 1 and 2 an optical smoke detector is shown comprising a housing with a circular base plate 1 and a correspondingly circular cover 2. The base plate 1 and circular cover 2 are attached to each other by at least one vertical eye 3, extending from an inner end surface 2*a* shown in partial cross section in FIG. 2, and at least one correspondingly and interengaging vertical hook 4 extending from the base plate 1 and shown in FIGS. 1 and 2. Additionally, at least one vertical tongue (not shown), extending from an inner (not shown) side wall surface 26, registers with a corresponding groove 5 that is defined by two lands 5*a* that are integrally attached to the base plate 1. The circular cover 2 further includes a grille 6 extending over approximately one third of the cover's end surface 2*a*, vents 7 extending over approximately one quarter of the cover's side wall surface 2*b*, and an outwardly tapered passage for a sliding, manually operated alarm actuating test button 8. Mounted on the circular base plate 1 and enclosed within the circular cover 2 is an electrical circuit board 9 that is held in place by holddown pins 10. The electrical circuit board 9 seats typical electrical components that are already well known in the art (represented in the drawing but not numbered), an alarm horn H and an optical block 11, all of which are in electrical association.

The optical block 11 shown in FIGS. 1 and 2, and with particularity in FIG. 3, comprises an infrared light emitting diode (IR LED) 12 such as type TIL 38 with a lens 13, an infrared photosensing cell 14 such as type TIL 413, a substantially broad, pivotally mounted moving wall member 15 canopied over the optical block 11 and a torsion spring member 16 compressed between hooks 26 and 27 on the block 11 and the moving wall member 15 respectively, urging the wall upward to the position shown in FIG. 2. The wall member 15 further comprises two lateral wings 17 for broadening the light scattering surface of the wall member 15. U-shaped sockets 18 receive the ends of a pivot pin 28 on the wall member 15. The test button 8 engages an extension 29 from the moving wall 15. In addition, two columns 19 (shown in FIG. 1) guide the inward movement of the moving wall member 15 towards the optical block 11 during manual actuation of the subject alarm system.

It should be noted that while infrared light emitters such as the TIL 38 and sensors such as the TIL 413 are preferred, the subject invention is also workable with visible light emitters and sensors.

Also shown in FIG. 3 is a reaction space or volume 20 between the moving wall member 15 and the optical block 11. The reaction volume 20 further comprises a primary reaction zone 20*a* and a fringe zone 20*b*. Light from the IR LED 12 is directed by the lens 13 on a first path 21 having an axis A1. The photocell 14 has a view of the first light path 21 on a second path 22 with an axis A2. The two paths 21 and 22 are approximate and somewhat idealized but their intersection is at the primary reaction zone 20*a* wherein smoke particles scatter light sufficiently to cause a significant response by the photocell 14. The wall 15, shown in both phantom and full line in FIG. 3, is in the fringe zone 20*b* when in the phantom line position and consequently outside the primary reaction zone 20*a*. Smoke in the fringe zone 20*b* does not scatter significant light to the photocell 14.

Manually depressing the actuating button 8 shown in FIGS. 2 and 3 causes the wall member 15 to pivotally move towards the optical block 11. As the wall moves from the phantom line position 15* to the solid line position 15, although it remains substantially out of the primary reaction zone 20*a* and does not intensify the light scattered from it, the wall-scattered light is gradually and continuously redirected more towards a lens 24 in front of the photocell 14. The increase in light received by the photocell 14 from a normal, but substantial level to a significant level occurs at a flat gradient without sharp rises, and therefore does not require critical or precise location of the LED 12, the photocell 14 or the wall 15. Consequently simulation of the predetermined smoke level is significantly more accurate and reliable.

The photocell 14 whose viewing path 22 intersects with the light path 21 at the primary reaction zone 20*a* is stimulated to functionally cause an electrical excitation of the alarm horn H, thereby to signal the simulated presence of a predetermined density of smoke particles.

Since the light scattering surface of the wall member 15 does not abruptly knife into the light path 21, the scattered light rays increase from an initial intensity to a greater intensity in a continuous gradient, unlike the wire, flag or beveled light scattering surface of the prior art that abruptly intrude into their respective reaction zones. Moreover, the canopy-like configuration of the moving wall member 15, with its open sides and broad coverage over both the LED 12 and the photocell 14, enables the wall member 15 to accomplish the dual and simultaneous function of excluding ambient light and scattering directed light from the LED 12, thus making the presence of ambient light substantially less critical than in the prior art. Furthermore, the broad surface of the wall member 15, with its lateral extension wings 17, simulates the presence of a predetermined smoke density with substantially less deference to various filament positions that can occur from one given light source to another than do the test devices of the prior art.

It should be understood that the present disclosure is for the purpose of illustration only and that this invention includes all modifications and equivalents which fall within the scope of the appended claims.

I claim:

1. An optical smoke detector comprising:
- a base;
- a source of light on the base directing light on a path;
- a photosensitive device on the base responsive to light scattered by particles in the light path; and
- a wall canopied over the source of light and photosensitive device and pivotally mounted on the base wherein the wall is normally held in the light path and has a substantial area on one side of a substantial volume viewed by the photosensitive device, the wall being mounted to move angularly toward the photosensitive device from a normal position in which an insignificant intensity of light is reflected by the area toward the device through intermediate angular positions closer to the device through which positions pivotal movement of the wall increases the light scattered to the device in a continuous gradient.

2. An optical smoke detector according to claim 1 wherein the source of light emits infrared light.

3. An optical smoke detector according to claim 1 wherein the photosensitive device senses infrared light.

4. An optical smoke detector according to claim 1 comprising means extending externally of the detector for manual actuation of the wall.

5. An optical smoke detector according to claim 1 wherein the moving wall comprises a canopy-like member pivotally mounted over an optical block supporting the photosensitive device, the wall being interposed between the device and ambient light.

6. An optical smoke detector according to claim 5 wherein the moving wall comprises a substantially broad primary light scattering surface that is both open at its sides to stray ambient light and separated from the optical block by a reaction volume from which source light is scattered by smoke toward the photosensitive device, and the reaction volume comprises a primary reaction zone and a fringe zone.

* * * * *